United States Patent [19]
Irwin, Jr. et al.

[11] Patent Number: 5,566,331
[45] Date of Patent: Oct. 15, 1996

[54] MASS STORAGE SYSTEM FOR FILE-SYSTEMS

[75] Inventors: Basil L. Irwin, Jr., Longmont; David L. Kitts, Fraser; Craig R. Ruff, Boulder; John L. Sloan, Arvada, all of Colo.

[73] Assignee: University Corporation for Atmospheric Research, Boulder, Colo.

[21] Appl. No.: 185,460

[22] Filed: Jan. 24, 1994

[51] Int. Cl.⁶ ................................................. G06F 13/00
[52] U.S. Cl. ...................... 395/600; 395/280; 395/650; 364/DIG. 1; 364/230; 364/DIG. 2
[58] Field of Search .................................. 395/600, 575, 395/200, 325, 700

[56] References Cited

U.S. PATENT DOCUMENTS

| | | | |
|---|---|---|---|
| 5,062,076 | 10/1991 | Ho et al. | 364/900 |
| 5,144,557 | 9/1992 | Wang et al. | 364/419 |
| 5,386,555 | 1/1995 | Kuroda et al. | 395/600 |
| 5,442,765 | 8/1995 | Shiga | 395/600 |

OTHER PUBLICATIONS

Sloan et al. "Massive: the mass storage system IV enterprise."; IEEE, vol. 81, No. 4, Apr. 1993; pp. 612–630.
Robert F. Bedoll, "Mass storage support for supercomputing."; IEEE, 1988, pp. 217–221.
Collins et al., "Profiles in Mass storage: a tale of two systems."; IEEE, 1988, pp. 61–67.
Wang et al., "xFs: a wide area mass storage file system.", IEEE, 1993, pp. 71–78.

*Primary Examiner*—Thomas G. Black
*Assistant Examiner*—C. Pham
*Attorney, Agent, or Firm*—Duft, Graziano & Forest, P.C.

[57] ABSTRACT

The mass storage system functions to archive, store, retrieve and manage the plurality of data files that comprise a typical file-system as a single uninterpreted bitfile. Client data processors access this file-system on a shared, channel-attached direct access storage device the same as if the file-system was located on a directly attached direct access storage device belonging exclusively to the client data processor. The direct access storage devices, archival storage devices and the client data processors which move the file-system bitfile between archival storage devices, direct access storage devices for access by the client data processors.

28 Claims, 7 Drawing Sheets

MASS STORAGE SYSTEM FOR FILE-SYSTEMS

FIELD OF THE INVENTION

This invention relates to mass storage systems and, in particular, to a mass storage system that stores and retrieves file-systems for an associated plurality of data processors.

PROBLEM

It is a problem in the field of mass storage systems to efficiently provide sufficient data storage capacity to serve a plurality of client data processors at high bandwidth. A mass storage system typically consists of a plurality of data storage devices that are interconnected via a high speed network or a data switching-channel to a plurality of client data processors. For the purpose of this document, a direct access storage device that is channel-attached to the client data processor with a non-switching data channel is not considered to be a mass storage system, although in some quarters a collection of one more of such devices is called a mass storage device.

A typical mass storage system configuration provides its client data processors access to data files with one of two basic file access methods. One file access method is called file staging, and the other is called network file service. Variations on these two file access methods are possible, but illustration of the two basic file access methods serves to describe the basic state of the art.

With file staging, a data file is copied in its entirety from the mass storage system to the client data processor before the user accesses any of the requested data. Usually the data file is staged from an archival storage device, but staging from a direct access storage device is possible as well. File staging is initiated by a client data processor transmitting a request to the mass storage system identifying the data file by name. The mass storage system maintains mapping information indicative of the physical memory storage location occupied by the requested data file. The retrieved mapping information is used by the mass storage system to transmit a file retrieval request to the archival storage device on which the requested data file is stored. Upon receipt of this request, the designated storage device copies the requested data file over the high speed network to a local, direct access data storage device that serves the requesting client data processor.

A significant limitation of this architecture is that the data is managed on a data file basis. Each client data processor request for a data file causes the mass storage system to access the mapping tables to locate the requested data file. When a client data processor sequentially accesses a plurality of data files, the mass storage system must successively access the mapping tables to identify each requested data file. As the extent of the mass storage system data storage capacity increases, the size and extent of the mapping tables proportionately increases and the time required to retrieve mapping information for each data file becomes a significant performance limitation of the mass storage system.

A mass storage system can be arranged as a hierarchical memory, with slower access-time storage devices being utilized as archival storage devices to store the data files that are less frequently used, while faster access-time storage devices are used as direct access storage devices to contain frequently accessed files. If a file that is located on an archival storage device is not also stored on a direct access storage device, then it may need to be staged (copied) to the direct access storage device prior to access by the client data processor. Therefore, the sequential access of a series of data files not only requires repetitive mapping table accesses, but also requires corresponding repetitive transmission of data files from the archival storage devices to the high speed storage device that is directly accessed by the client data processor. Such overhead represents a significant fraction of the data file access time and, as the mass storage system increases in capacity and the amount of staging activity also increases, the data throughput of the mass storage system is throttled by the administrative overhead of sequentially accessing data files that are successively requested by the client data processors. As a result of this overhead, users may be forced to combine their data into large files to maximize data processing efficiency. This organization results in inefficient access to subsets of data in the file, or may result in a processing burden since some types of mass storage systems may have to interpret the data in the retrieved data file to provide access to the requested subset of data in the data file. If the mass storage system must interpret the data in the data file, then the internal structure of the data files is limited to only structures understood by the mass storage system.

With the network file service access method, file access is relatively transparent to the user compared to file staging. With network file service, the user on the client data processor is accessing a file in a remote file-system located on some remote file server as if the remote file-system was local to the client data processor. As with accessing a local file-system, access to such a remote file-system requires no prestaging of the accessed data file. Data from file-system data files are simply passed to the user at the time and in the order requested by the user. This type of data file access is much more convenient to the user than file staging. However, one drawback is that a great deal of processing overhead is incurred to effect the transaction across the network. Another drawback is that the remote file server must perform file-system processing for the client data processor, and if the remote file server is slower than the client data processor or the remote file server is overloaded, then data file access by the client data processor is greatly slowed.

SOLUTION

The above-described problems are solved and a technical advance achieved in the field by the mass storage system for file-systems of the present invention. This mass storage system incorporates many of the architectural features of existing mass storage systems but provides a significant performance improvement over these prior art systems by managing data on a file-system basis for the associated client data processors. Essentially, this mass storage system stages file-systems as bitfiles between archival storage devices and direct access storage devices. Because these direct access storage devices are channel-attached to the client data processor, the file-systems contained thereon may be efficiently accessed by the client data processors exactly as if they were located on local data storage devices. Since entire file-systems are staged rather than individual data files, staging becomes less convenient to the user since multiple, associated file sets are staged together. On the other hand, by staging whole file-systems without interpretation to a storage device which is channel-attached to the client data processor, the inefficiencies and bottlenecks of network file service are avoided. Thus, this mass storage system design combines the benefits of file staging and network file service, but at the same time minimizes the drawbacks of each. More particularly, this mass storage system maintains each individual file-system as a single bitfile, rather than as a plurality of files, and maintains only the mapping information sufficient to identify the physical archival location of the file-system bitfile. Whenever a user on a client data processor requests access to a data file, the file-system code in the operating system on the client data processor determines which file-system contains the requested file, and whether that file-system is already available to the client data processor. If the needed file-system is not available, then the client data processor requests the mass storage system to make the requested file-system available. The mass storage system then stages the entirety of the file-system in the form of a bitfile from the backend archival storage devices to a high speed direct access device that provides direct I/O channel access to the client data processor, via a switched-channel connection to the client data processor.

The use of a per file-system mapping significantly reduces the administrative burden on the mass storage system since the number of entries in the mapping table that must be scanned by the mass storage system to serve a request from a client data processor is significantly reduced. In addition, the excessive sequential access times required in prior art systems to retrieve a plurality of interrelated or successively required data files for a client data processor are eliminated, since the plurality of data files are retrieved in a single continuous file-system access operation. On the other hand, use of a switched-channel to allow access by the client data processor to the staged file-system provides the user transparent access to the file-system at effective and efficient data transfer rates that don't incur the network overhead required by network file service.

The mass storage system stores file-systems as bitfiles and does not interpret the contents of the file-system. The requesting client data processor interprets the organization of the file-system, thereby minimizing the processing burden on the mass storage system. In addition, the mass storage system establishes a switched-channel connection between the requesting client data processor and the direct access storage device upon which the retrieved file-system resides. This channel connection allows the requesting client data processor to treat the retrieved file-system as if the requested file-system resided on a direct access storage device that was locally attached to the requesting client data processor, thereby both simplifying and speeding access to the retrieved file-system by the requesting client data processor.

By processing the client data processor data files on a file-system basis, they can be stored as uninterpreted bitfiles on the archival storage devices of the mass storage system. The transfer of a large bitfile makes optimum use of the high bandwidth channel-switching fabric and the direct access and archival storage devices that it interconnects, and also eliminates the need for numerous successive data file requests. This architecture also allows diverse types of file-systems to be stored on the mass storage system since they are stored as uninterpreted bitfiles and only the client data processors must interpret the data contained in the file-systems that are stored as bitfiles.

DETAILED DESCRIPTION

The mass storage system of the present invention functions to store and retrieve file-system bitfiles for a plurality of client data processors in a manner that is transparent to users of the client data processors. In particular, the mass storage system stores the plurality of data files that comprise a typical file-system as a single bitfile. In existing mass storage systems, each of these data files is requested individually by name by the client data processor, requiring the mass storage system to sequentially access the mapping tables to identify the physical archival media location of each requested data file. As each data file is requested, the mass storage system uses the retrieved physical memory storage location information to transmit commands to the data archival storage device on which the data file is stored to cause it to stage (copy) the requested data file to a high speed direct access storage device for access by the client data processor.

The mass storage system of the present invention maintains data indicative of the physical location of a bitfile that comprises the plurality of data files in the file-system. Therefore, when a client data processor requests access to the file-system or one of the files contained therein, the mass storage system of the present invention retrieves the entirety of the file-system in anticipation of sequential accesses to a plurality of the data files stored therein. This anticipatory staging of a plurality of data files, even though they have not been requested, makes optimum use of the high bandwidth data transfer capabilities of the mass storage system's storage devices and switching-channel. This method of staging minimizes the response time of the mass storage system to serve what may have been multiple related requests from a client data processor by alleviating the need for the mass storage system to sequentially stage a plurality of data files for the client data processor.

Architecture of the Mass Storage System of the Present Invention

Figure 1:
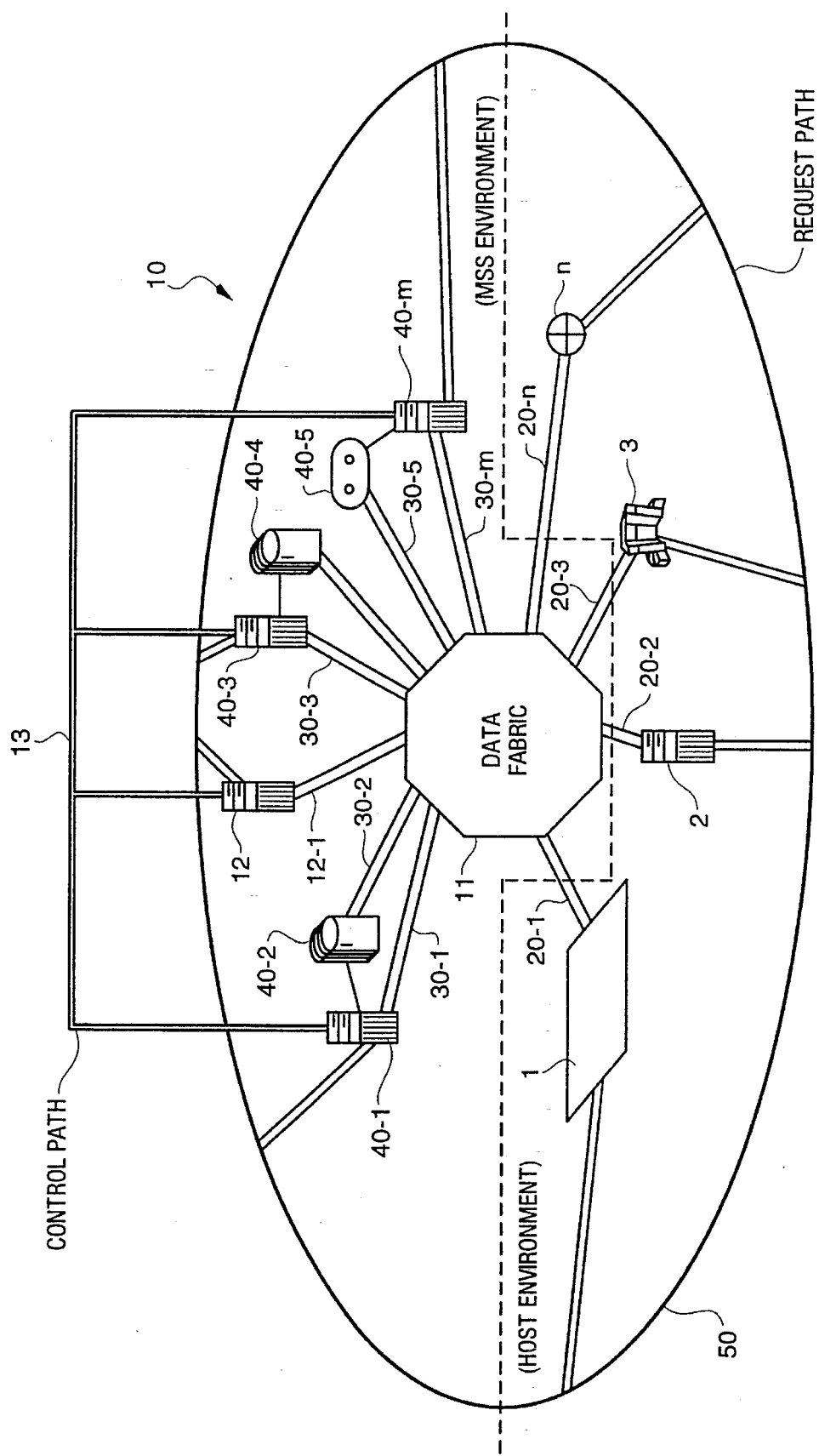
FIGS. 1 and 2 illustrate in block diagram form the overall architecture of the Mass Storage System of the present invention.

FIG. 1 illustrates in block diagram form the basic architecture of the mass storage system 10 of the present invention, showing typical types of client data processors and typical types of storage devices. This diagram is for purposes of illustration only, and is by no means all inclusive of the types of client data processors and types of storage devices that can be attached to mass storage system 10. As illustrated, mass storage system 10 is connected to and serves a plurality of client data processors 1-n. These client data processors 1-n can represent any of a plurality of types of client data processors, such as a massively parallel computer 1, a UNIX file server 2, a supercomputer 3, a cluster computer n. It would also be possible to connect a data communication network processor. Data processors 1-n may each be equipped with their own individually connected storage devices (not shown) that are not a part of mass storage system 10 in addition to being connected to mass storage system 10. The interconnection of the plurality of client data processors 1-n with mass storage system 10 is via high speed data channels 20-1 to 20-n, each of which serves to connect a corresponding one of client data processors 1-n with mass storage system 10. Mass storage system 10 is equipped with a high speed channel-switching fabric 11, which is connected to high speed data channels 20-1 to 20-n. The channel switching fabric 11 functions to controllably interconnect the data channels 20-1 to 20-n of the associated data processors 1-n with selected high speed interface channels 30-1 to 30-m, each of which is connected to a corresponding data storage device 40-1 to 40-m.

The plurality of data storage devices 40-1 to 40-m can comprise a hierarchy of data storage devices of varying technologies, physical configurations, data storage capacity, and access characteristics. In particular, a subset of possible devices are illustrated in FIG. 1 and for illustrative purposes comprise a RAID-3 disk array data storage subsystem which consists of 1) a data storage server 60-1 and a plurality of disk drives 40-1; 2) a RAID-5 disk array direct access data storage subsystem, which consists of a data storage server 60-2 equipped with a plurality of disk drives 40-2; and 3) a tape drive sequential access data storage subsystem, which consists of a data storage server 60-m as well as physical volume repository 40-m which can be an automated cartridge library system for robotically storing and retrieving a large plurality of data storage cartridges, such as 3480-type magnetic tape cartridges.

Many other types of storage devices can be connected to mass storage system 10 besides the ones shown in FIG. 1. This diversity of data storage devices used to implement mass storage system 10 enables the bitfiles to be stored on a media having data storage characteristics that are appropriate for the particular bitfile. Therefore, bitfiles that are infrequently used can be stored on the automated cartridge library system 40-m/60-m, while more frequently used bitfiles can be stored on data storage devices that have shorter access times, such as the RAID-5 data storage subsystem 40-2/60-2. The mass storage system 10 manages the placement of the bitfiles on the plurality of data storage devices and stages bitfiles from archival data storage devices, such as the automated cartridge library system 40-m/60-m to high speed direct access storage devices such as the RAID-5 data storage subsystem 40-2/60-2.

Description of a Typical Conventional File-System Access

Figure 2:
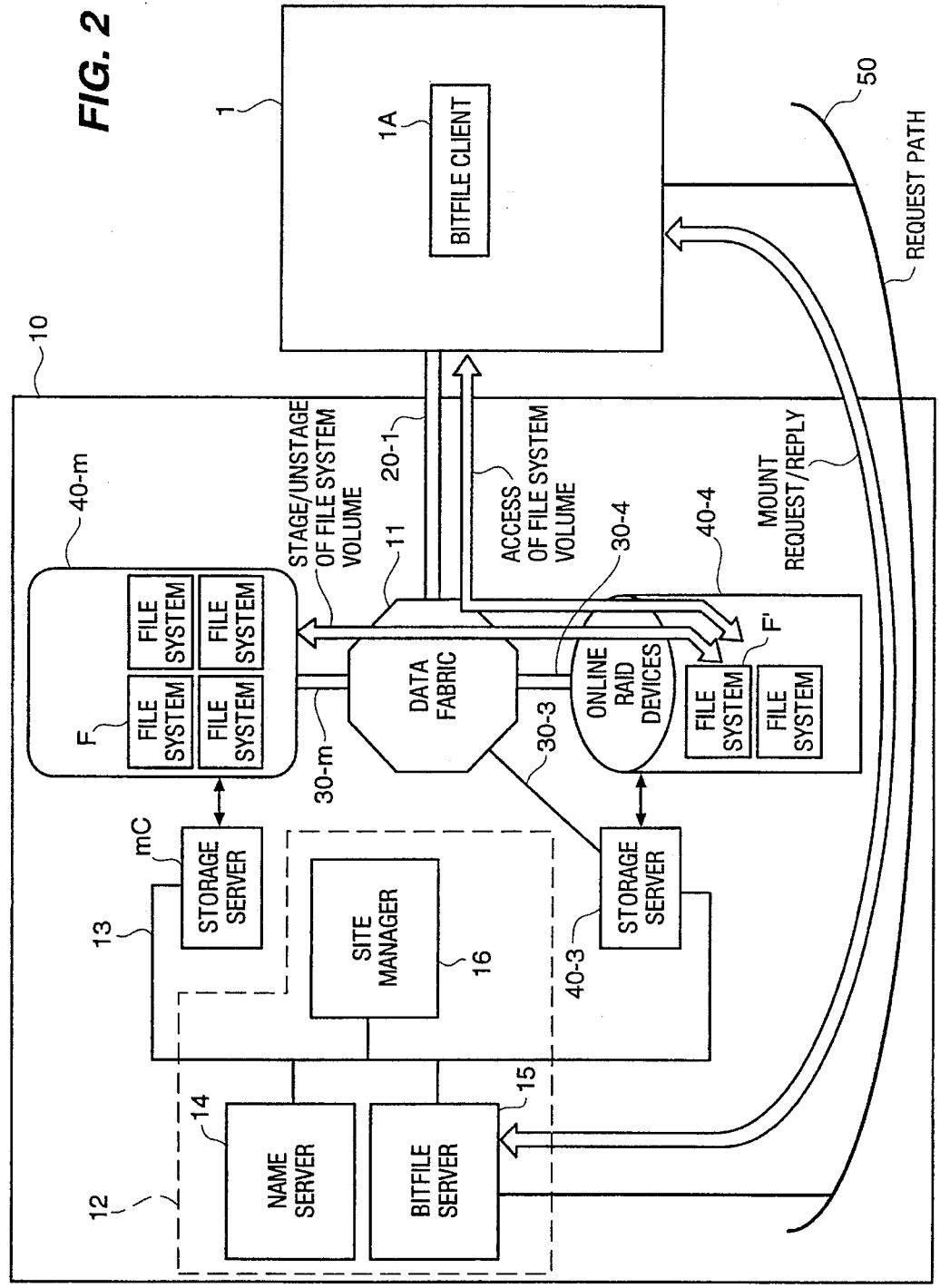

As shown in FIG. 2, for a user/application of a client data processor 1 to access any byte within any file within any local file-system F', the file-system code 203 of the operating system 1A on the client data processor 1 must translate the provided path name identifying the file and the ordinal number identifying the byte within the file into the address of a block on a particular direct access data storage device. This procedure describes how this is done in a typical client data processor 1:

1. The user/application 201 requests access to a particular byte within a particular file through the client data processor's operating system 1A. The file is identified by path name and the byte within the file is identified by ordinal number.

2. The operating system's file-system code 203 determines in which file-system F' the file resides. This is done by the following convention: all files and directories in the same file-system share the same beginning portion of a path name. Each file-system is uniquely identified by its path name prefix.

3. The operating system's file-system code 203 determines on which direct access data storage device 40-2 the file-system F' resides. This association of file-system F' to data storage device 40-2 is performed when the file-system F' was mounted. As long as the operating system 1A functions, a file-system F' need only be mounted once; thereafter, the operating system 1A remembers where the file-system F' is located.

3.1 If the needed file-system F' must be mounted, a mount request is made to the operating system 1A by the file-system code 203. This request includes the path name prefix associated with the file-system F', and the I/O channel, device controller, and direct access data storage device 40-2 on which the file-system F' resides.

3.2 When the operating system 1A receives a mount request, it reads predefined blocks from the data storage device 40-2 (e.g. blocks 0 through 2), which contain information about where on the data storage device 40-2 are blocks containing more detailed information about the organizational structure of directories and files stored in the file-system F'. It reads these predefined blocks (or any other blocks) by passing a request to the device driver 300 to read these blocks. The device driver 300 translates these requests for blocks into physical I/O commands and sends them to the associated storage server 60-2 via the appropriate I/O channel. The storage server 60-2 handles the actual transaction with the storage device 40-2. The device controller passes the data contained in the requested blocks back across the I/O channel to the client data processor 1 where it is received by the operating system 1A.

3.3 The operating system 1A uses the information in the predefined blocks to locate and read the blocks containing the more complete information regarding the structure of the file-system F' on the data storage device 40-2.

3.4 Once the mount process is complete, the operating system 1A knows with which data storage device 40-2 a particular file-system F' is associated, and has a basic knowledge of the underlying structure of that file-system F'. This basic knowledge includes the location of the root directory of the file-system F', that is, the directory from which all other files and directories branch out in a hierarchical manner.

4. After a mount, but prior to the data file access, the operating system 1A knows on which direct access data storage device 40-2 to find the file, but it does not know where on the storage device 40-2 the blocks comprising the file reside. It determines this by starting with what it knows: the location of the blocks comprising the root directory. The information in these blocks points to the next directory in the path name of the file it is looking for. The operating system 1A then reads the blocks comprising that directory, which in turn leads it to the next directory in the path name. In this manner, the blocks comprising successive directories can be read until the directory actually containing the file in question is found. This directory then contains information pointing to the location of the actual blocks comprising the file.

5. The operating system 1A uses this information to determine which block in the file contains the referenced byte. This block is read, the byte identified by its own ordinal number, and the byte returned to the user/application 201.

6. When a file-system F' is no longer needed, it can be dismounted. To dismount a file-system F', the operating system 1A completes any pending requests made by users 201 to access or alter files and directories in the file-system F', and then relinquishes the information regarding the internal structure of the file-system F'. Once this is done, files in the file-system F' cannot be accessed unless the file-system F' is remounted. A file-system F' might be dismounted because the direct access data storage device 40-2 which contains the file-system F' uses removable medium (such as a floppy disk) to contain the file-system F', and the user desires the use of a different file-system F' on a different piece of removable media.

Physical Elements of a File-System Data Access

Figure 3:
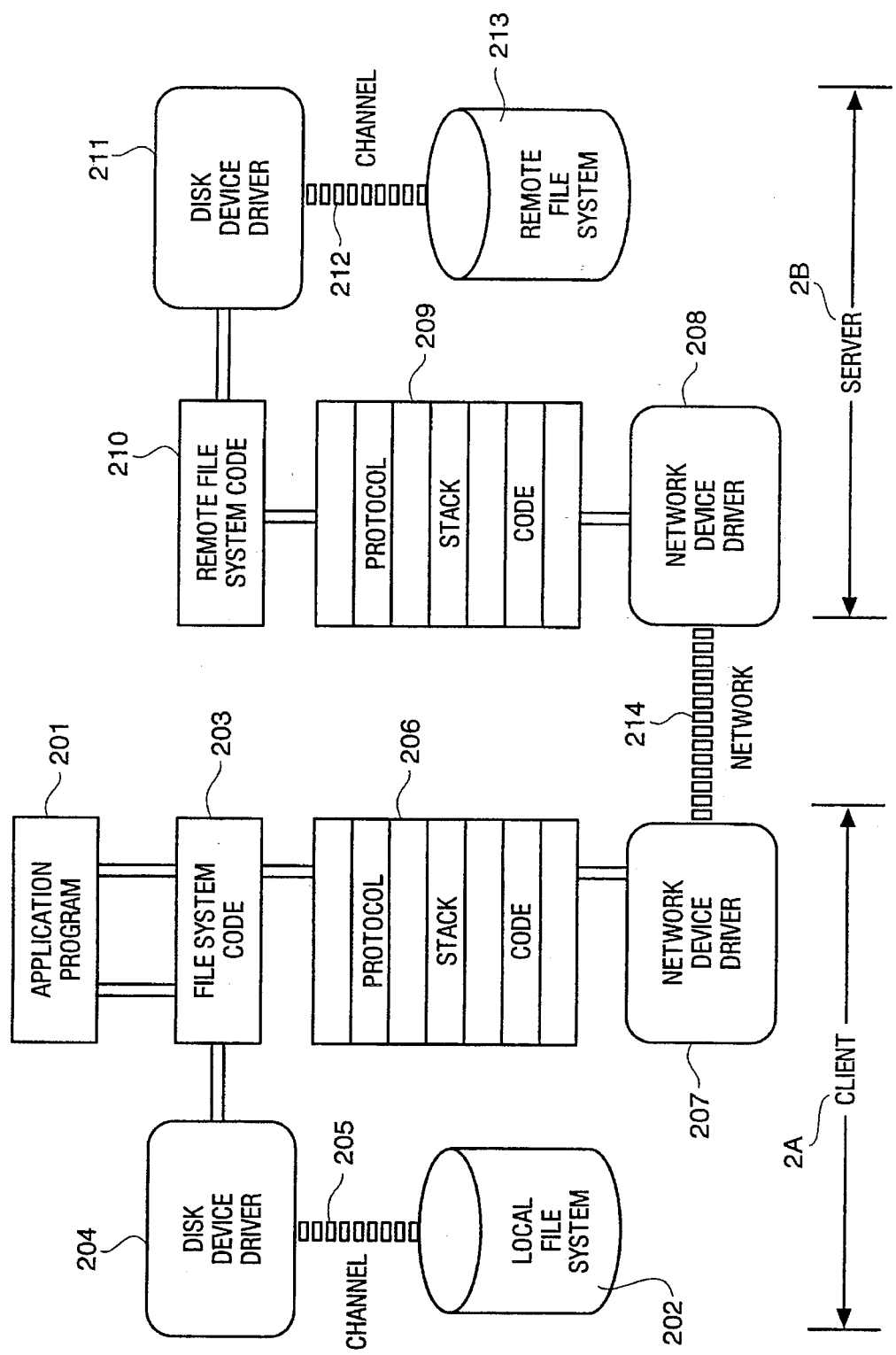
FIG. 3 illustrates a block diagram of the various elements required to conventionally access a file-system from a local or remote file server.

FIG. 3 is a conceptual diagram that illustrates the various elements required to provide an application program 201 with access to a data file in a mounted file-system. This data file may reside on a local file-system 202 located on a local storage device 215 attached to the client data processor 2A, or the data file may reside on a remote file-system 213 located on a remote storage device 214 attached to a remote server 2B. Access to a data file on the client data processor 2A is referred to as local file access, while access to a data file on the remote server 2B is referred to as remote file access or network file service.

Local File Access

When, for example, a UNIX application program 201 resident on a client data processor 2A reads a data file from a local file-system 202 located on a local storage device 215, the I/O request passes through the file-system code 203 in the client data processor's operating system where it is translated into a read I/O command for a specific data block of the local file-system 202. The read I/O command is passed to a the client data processor's storage device driver 204, which is the operating system's lowest level software interface to the physical storage device. The storage device driver 204 translates the read I/O command into a set of physical I/O commands appropriate to the particular designated data storage device. The I/O commands are passed to the local storage device I/O controller 216 through an I/O data channel 205, which is a special purpose data path that links a particular client data processor with a data storage device controller. The requested block is then passed back to the application program in the reverse direction of the path just described.

Network File Service

When a UNIX application program 201 reads data from a file residing in a remote network server file-system 213 located on a remote network file server 2B, the path that the request takes is quite different than is the case for local file-system access. A network file server provides a remote data storage service implemented as the top layer of the internet protocol stack 206/209. The remote network server 2B is typically accessed over local area networks 214 based on physical transport mechanisms such as Ethernet. The original I/O request still passes through a portion of the client data processor system's file-system code 203, but it then it takes a detour through the network 214, the network device drivers 207/208 and the protocol stack code 206/209.

The request is first routed by the local file-system code 203 through the local protocol stack code 206, which encapsulates the request into one or more network datagrams, which are then sent to the local network device driver 207. In the local network device driver 207, the network datagram(s) containing the request are further encapsulated into packet(s) suitable for the physical transport mechanism such as a packet switching network 214.

The packet(s) travel from the client server client data processor 2A over the switching network 214 to the remote network server 2B, where they are received by that machine's network device driver 208. The resulting decapsulated datagram(s) travel up through the protocol stack 209 in the remote network server 2B, where the original input/output request is finally extracted by the remote file system code 210. The original input/output request is translated into the appropriate I/O block read command which is then passed through the remote storage device driver 211, down a data I/O channel 212, and to the physical storage device controller 217 for actual execution. The resulting data block obtained from the storage device 218 must make the return trip through the protocol stacks 209/206, the network device drivers 208/207 and the network 214. Because such protocol stacks and network transport mechanisms are general purpose in nature, they necessarily provide capabilities and impose overhead beyond that which is required for any one specific use. In particular, the expense of this overhead may not be great when used to serve relatively low performance client data processors, but it is very costly when the client data processor is a mainframe computer or a supercomputer which is placed in an idle state waiting for the data request to be serviced. In addition, many protocols and transport mechanisms enforce relatively small maximum datagram or packet size which prevents the overhead from being reduced by increasing the amount of data transferred for each request.

Description of Mass Storage System 10 Data Access

In the preceding description, the client data processor, I/O channel, direct access storage device controller, and direct access storage device were closely coupled with a particular client data processor, and the file-system was closely coupled with a particular direct access data storage device. In contrast, mass storage system 10 allows file-systems to be decoupled from particular data processors and from particular direct access data storage devices, and also allows particular direct access data storage devices to be decoupled from particular client data processors. Mass storage system 10 stages file-systems as bitfiles between archival storage devices and direct access storage devices that are efficiently accessed by the client data processors as local direct access storage devices, thus allowing the file-system data processing to be efficiently performed on the client. Since whole file-systems are staged rather than individual data files, staging becomes less convenient to the user since multiple, associated file sets are staged together. On the other hand, by staging the file-systems to a direct access storage device channel-attached to the client, the inefficiencies and bottlenecks of network file service are avoided. Thus, this mass storage system design combines the benefits of file staging and network file service, but at the same time minimizes their drawbacks.

Hardware resources are also utilized effectively and efficiently. File-systems are efficiently moved between direct access storage devices, where they may be accessed as file-systems by client data processors, and sequential access data storage devices, where they may be cost effectively stored when not being used. Additionally, the mass storage system 10 allows a single direct access storage device to be used concurrently to provide file-systems to several data processors, thereby allowing more efficient use of an expensive resource. Mass storage system 10 also allows each client data processor the possible use of many file-systems located on many different direct access storage devices.

Detailed Access Description

As is the case with conventional file-system access, when a user requests access to a particular byte in a particular file, the operating system on the user's client data processor must translate the path name of the file and the ordinal number identifying the byte within the file into the address of a block on a particular direct access storage device. However, with mass storage system 10 as shown in FIGS. 1 and 2, the file-system F' may not reside on the direct access storage device 40-2 when the request is made, and the direct access storage device 40-2 may not be known by the client data processor 1, even though a physical path exists between them via I/O channels 20-1 and 30-4 and the channel switching-fabric 11.

Figure 6:
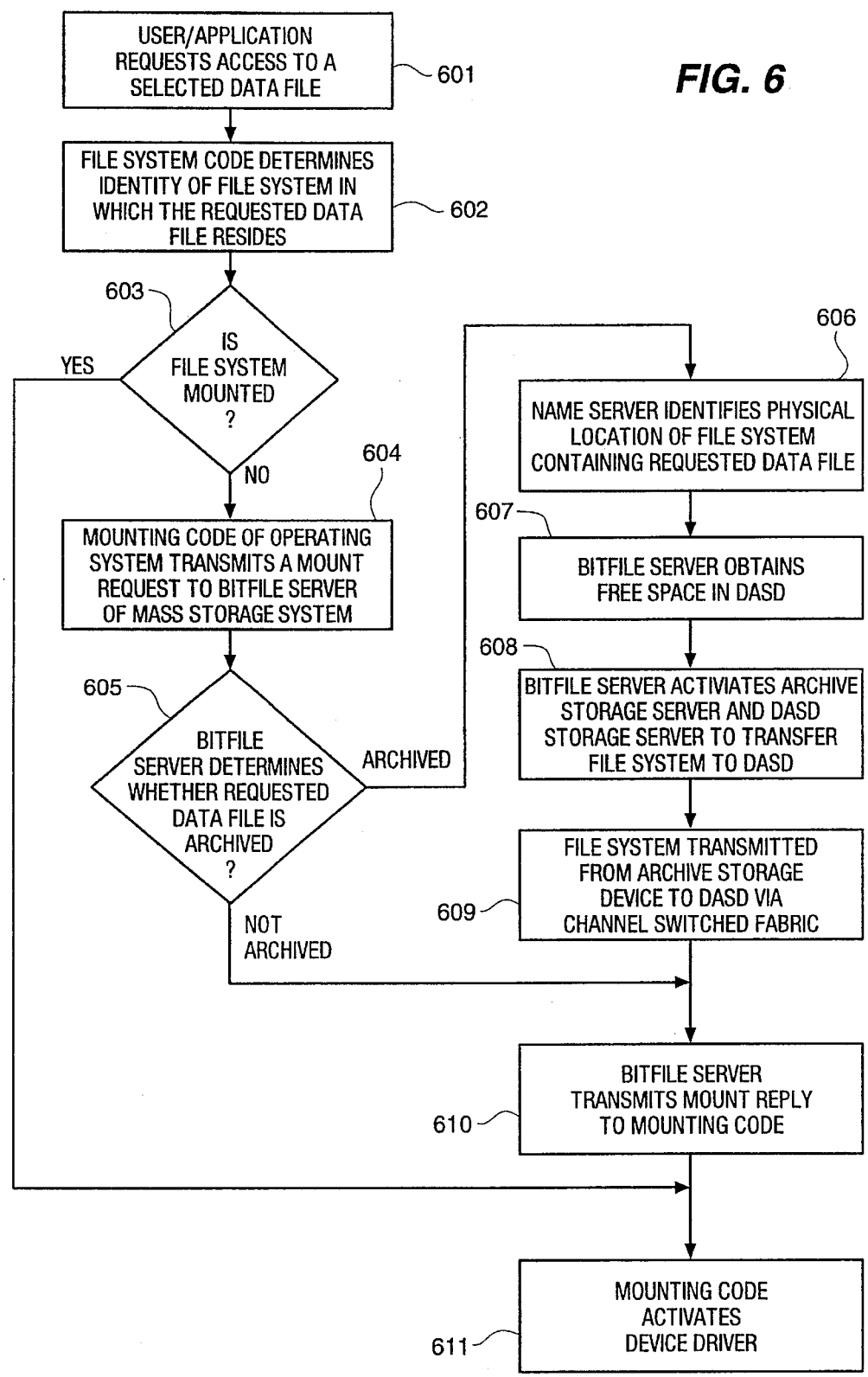
FIG. 6 illustrates in flow diagram form the operational steps taken to mount a file system.
Figure 7:
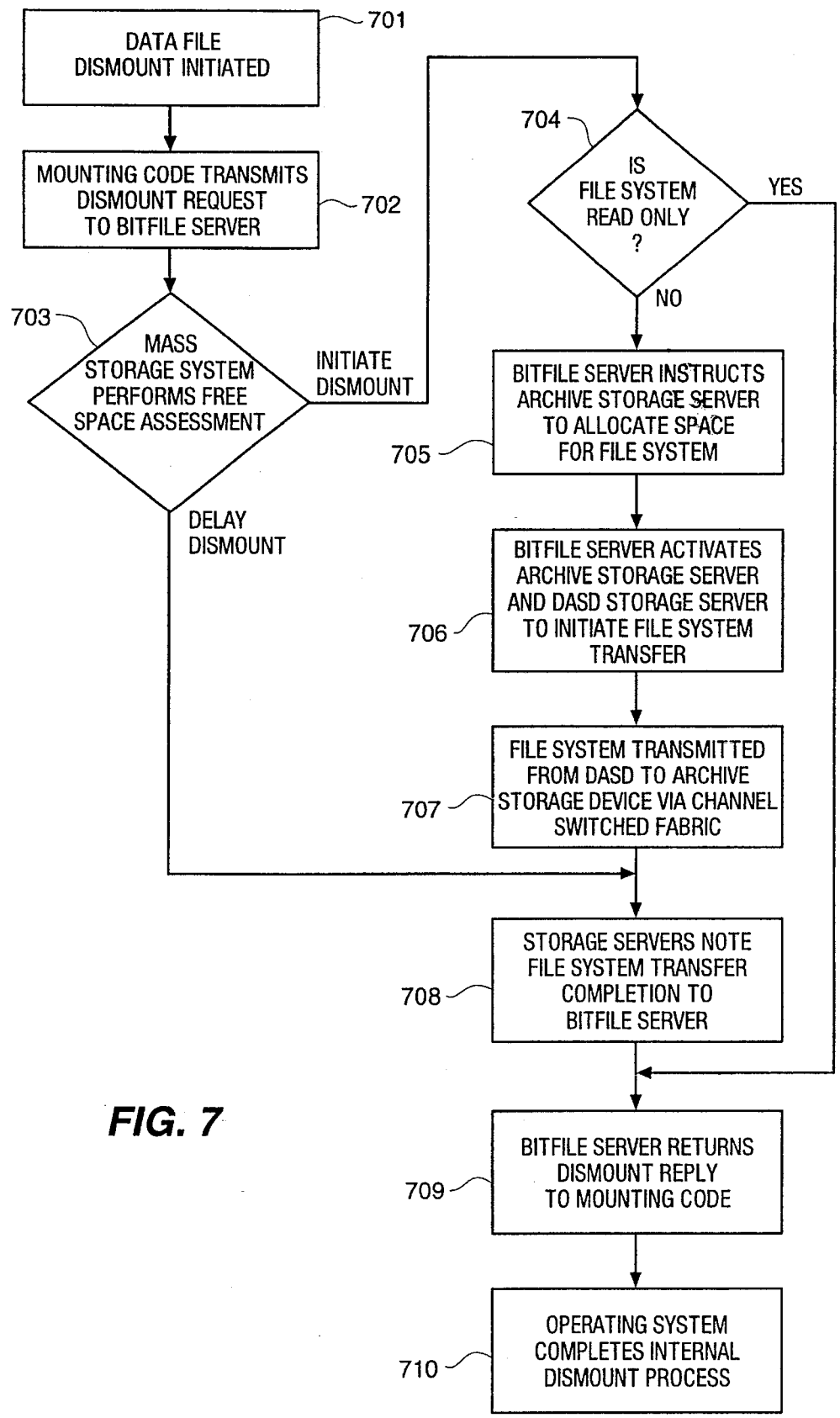
FIG. 7 illustrates in flow diagram form the operational steps taken to dismount a file system.

The following sections and the flow diagrams of FIGS. 6 and 7 describe how file-system access is accomplished using mass storage system 10.

The user/application 201 at step 601 requests access to a particular byte within a particular file through the file-system code 203 of the client data processor's operating system 1A. The file is identified by path name and the byte within the file is identified by ordinal number. The operating system's file-system code 203 determines at step 602 in which file-system F' the file resides. This is done by the following convention: all files and directories in the same file-system share the same beginning portion of a path name. Each file-system is uniquely identified by some path name prefix.

The operating system 1A determines at step 603 if the needed file-system F' is mounted (known and available on direct access storage), and if so, on which direct access data storage device the file-system F' resides. This association of file-system to data storage device is performed when the file-system F' is mounted. As long as mass storage system 10 and operating system 1A function, a file-system need only be mounted once; thereafter, the operating system 1A remembers where the file-system is located. If the file-system F' is mounted, then access to the file-system F' can proceed as described starting with step 611 below. If the file-system F' is not mounted a mount request by the client data processor's 1 operating system 1A must be performed according to the following steps.

A mount request is made at step 604 code 17 over network mount request/reply path 50 to the mass Storage system 10 bitfile server 15. This request includes the path name prefix associated with the file-system F'. The mass storage system 10 bitfile server 15 determines at step 605 whether this requested file contained in the file-system F' is archived on a sequential access data storage device 40-m, or whether the file-system F' is already mounted on a direct access data storage device. If the requested file-system F' is already mounted on a direct access data storage device, then the mount request is denied to the requesting host unless the mount request was for read-only access and the mounted file-system was previously mounted read-only, in which case the mount request can be immediately granted. In either case, a mount reply is made to the requesting client data processor 1 at step 610. If the file-system F' is archived but not previously mounted, then the following steps occur.

Mass storage system 10 maintains a mapping in name server 14 which shows on which blocks on which sequential access data archival device 40-m every archived file-system is stored. It determines at step 606 the location and size of the archived file-system F' using this mapping and the path name received from the requesting client data processor 1. Mass storage system 10 maintains a mapping via the storage server 60-2 of which blocks on every direct access data storage device 40-2 managed by mass storage system 10 are currently being used by other file-systems, and which ones are available for new use. At the instruction of bitfile server 15 via control path 13, storage server 60-2 at step 607 locates a suitable sequence of unused blocks on a suitable direct access data storage device 40-2 large enough to hold the archived file-system F', and reserves this space. The bitfile server 15 now has enough information to instruct storage servers 60-m and 60-2 via control path 13 at step 608 to copy file-system F' from data archival device 40-m to the reserved space on direct access storage device 40-2. Each of the two storage servers 60-m, 60-2 controls its associated data storage device 40-m, 40-2 during this file copy operation via paths 18-m and 18-2, respectively. Depending on the capabilities of the storage devices, this control may minimal. On the other hand, this control may need to be exercised in great detail and additionally, the two storage servers 60-m, 40-m may have to communicate with each other via control path 13 to effect the copy. Once the file-system F' has finished being copied at step 609 from archival storage device 40-m to file-system F' on direct access storage device 40-2, storage servers 60-2 and 60-m notify bitfile server 15 via control path 13.

The bitfile server 15 at step 610 returns a mount reply to mounting code 17 regarding the original mount request and data about how to access the file-system F'. However, if for any reason the mount request couldn't be successfully completed, the mount reply indicates that the mount request failed. In the case of a successful mount, the mount reply contains information about which direct access storage device 40-2 contains file-system F', and where on direct access storage device 40-2 file-system F' is located. Depending upon the capabilities of the direct access storage device 40-2, location information consists of either a handle value, or an offset value that the client data processor 1 device driver 300 must add to the block address value of each I/O request. In the case of the handle value, the device driver 300 sends unaltered block addresses in its I/O requests to the direct access storage device 40-2, but includes elsewhere the handle value, which is used by the direct access storage device 40-2 to decide what offset value it should add to the received block addresses.

Upon receiving a successful mount reply, at step 611 the mounting code 17 communicates information received in the mount reply to the device driver 300 so that the device driver 300 knows which direct access storage device 40-2 contains the file-system F', and where on the direct access storage device 40-2 file-system F' is located. The mount is now complete, and file-system F' access can proceed between the direct access storage device 40-2 and device driver 300 across the channel-switching fabric 11 and networked channel paths 20-1 and 30-4 without further intervention by storage server 60-2 or mounting code 17.

Because there is no essential difference between a direct I/O channel path and a switched channel path, no part of operating system 1A (excepting the lowest level of device driver 300) need behave any differently regarding access of file-system F' than it would if file-system F' were to be mounted on a direct access storage device directly channel-attached to client data processor 1. Like any other file-system, the mass storage system 10 file-system F' is accessed via a device driver 300 specific to the storage device 40-2. Therefore, access to file-system F' proceeds essentially as described above in "Local File Access", and in steps 3.2, 3.3, 3.4, 4, and 5 of "Description of Typical Conventional File-System Access". Similar to what was described in those steps, eventually the device driver 300 produces I/O commands for the direct access storage device 40-2, but additionally encapsulating them in the form required by the channel-switching fabric 11, and writing the encapsulated I/O commands onto I/O channel 20-1. Such encapsulated commands are switched by the channel-switching fabric 11 onto I/O channel 30-4 where they are read by the controller (not shown) of storage device 40-2, decapsulated and executed by the controller for storage device 40-2, resulting in one or more data blocks being transferred to/from device driver 300 via the path comprised of I/O channel 30-4, channel-switching fabric 11, and I/O channel 20-1.

File System Dismount

When a file-system F' is no longer needed, it can be dismounted. Either the bitfile server 15, operating system 1A, or the user/application 201 may initiate the dismount request at step 701. Dismounting may be initiated for a large number of reasons. Typically, a user/application 201 may initiate a dismount request because the file-system F' is no longer needed. Typically the operating system 1A may initiate a dismount request as a part of its shut down procedure, or because it detects no use of the file-system F' by the user/application 201, or because it detects some type of failure while accessing file-system F'. Typically the bitfile server 15 may initiate a dismount request as part of the shut down procedure of mass storage system 10, because it detects no use of the file-system F', or because it detects some type of failure while accessing file-system F'. A dismount request initiated by the bitfile server is executed starting with step 6.1. A dismount request initiated from client data processor 1 is executed by the following steps.

Dismount requests initiated from client data processor 1 result in mass storage system 10 waiting until all outstanding activity for file-system F' on client data processor 1 are completed or terminated. A dismount request is then sent at step 702 by the mounting code 17 to the bitfile server 15 via network mount request/reply path 50. Bitfile server 15 delays executing this request until pending operations on the file-system F' are finished or terminated by mass storage system 10. Mass storage system 10 then determines at step 703 whether there is enough unused memory space on direct access storage device 40-2 to service present and anticipated requests for other file-systems made by client data processor 1 and other client data processors. If enough unused memory space is available, the remainder of this procedure may be delayed in the expectation that the dismounted file-system F' may be mounted again in the near future, and execution proceeds at step 708 regarding the present dismount request. If or when the memory space is needed, bitfile server 15 determines at step 704 if file-system F' was a read-only file system. If F' was read-only then execution proceeds at step 709. If F' was not read-only, then the following steps are executed.

Bitfile server 15 at step 705 instructs storage server 60-m via control path 13 to locate an unused portion of archival media sufficient to receive file-system F", a copy of file-system F', and to reserve this unused portion. The bitfile server 15 now has enough information to instruct storage servers 60-m and 60-2 via control path 13 to copy file-system F' at step 706 from direct access storage device 40-2 to the reserved space on archival storage device 40-m. Each storage server 60-m, 60-2 controls its associated storage device 40-m, 40-2 during this data file copy operation via paths 18-m and 18-2 respectively. Depending on the capabilities of the storage devices, this control may be minimal. On the other hand, this control may need to be exercised in great detail and additionally, the two storage servers 60-m, 60-2 may have to communicate with each other via control path 13 to effect the copy at step 707.

Once the file-system F' has finished being copied from direct access storage device 40-2 to file-system F" on archival storage device 40-m, storage servers 60-2 and 60-m notify bitfile server 15 via control path 13 at step 708. Bitfile server 15 and storage server 60-m now mark the archival media space occupied by the original file-system F as unused, and at the same time consider file-system F" to now be the new file-system F for future mount requests for file-system F. The bitfile server 15 also returns at step 709 to the mounting code 17 a dismount reply regarding the original dismount request regarding file-system F'. However, if for any reason the dismount request could not be successfully completed, the dismount reply indicates that the dismount request failed.

Upon receipt of the dismount reply, the operating system 1A can complete its own final procedures regarding the dismount at step 710. In the case of a dismount reply resulting in a dismount request initiated by mass storage system 10, operating system 1A has more complicated steps to take than if the dismount request initiated on client data server 1 because activity may still be pending on client data server 1 for file-system F'.

Importance of the Channel-Switching Fabric for File-System Access

There is an important distinction between a network and a channel. A network is a general purpose data communications path which connects a plurality of client data processors to one another for general communications purposes. Data that moves through such a network is usually processed through many layers of software. Since both the network hardware and the network software is general purpose, neither is optimized for any particular task. In particular, general purpose network hardware and software is generally incapable of connecting client data processors and remote data storage devices at data communication transfer rates capable of driving such data storage devices at their full data transfer rates.

A channel is a special purpose communications path which is designed to connect a client data processor to a data storage device at very high data transfer rates. Data that moves through a channel is handled with simple, special-purpose, lower level of protocol and therefore with lower overhead than with a network.

The mass storage system 10 of the present invention enables users and client applications to access file-systems through what appears to be a directly attached storage device via a conventional block-access storage device driver 300, yet no performance penalty occurs as would be the case with any method of accessing a storage device across a network. It is transparent to the users, applications, operating systems, client data processors, and the storage and archival devices that a plurality of block I/O requests and data for a plurality of file-systems and a plurality of staging operations move through a high performance channel switching-fabric 11, which is simultaneously handling the switching of channel connections between a plurality of client data processors 1-n and a plurality of data storage devices 40-1 to 40-m.

To effect such transparency as provided by mass storage system 10, the only major modifications necessary to the client data processor 1 operating system 1A are modifications to the client data processor device driver 300 attached to the channel switching-fabric 11. Generally, device driver modifications are not difficult since most operating systems are designed to have new device drivers easily added. The mounting code 17 is not a part of the operating system; it is generally installed as a user-level process. Therefore, the operating system code is not affected by the addition of the mounting code 17, although it is expected that slight modifications to the file-system code 203 may be necessary. Even here, the modifications are not expected to be too difficult because most file-system codes already include provisions for distinguishing between locally and remotely mounted file-systems, and also include provisions for communicating with mounting codes somewhat similar to mounting code 17.

Mass Storage Communication Paths and System Servers

The present mass storage system 10 is implemented using three different communication paths. The bitfile server 15 is the sole interface to the mass storage system 10 by client data processors 1-n, and manages all bitfile aspects of client data processors' file-systems, such as file-system mounting and dismounting. On the other hand, all access by client data processors of file-system data blocks occurs through the channel switching-fabric 11, without intervention by the bitfile server 15. In particular, the main task of the bitfile server 15 is to manager the task of staging, that is copying file-systems back and forth between archival storage devices and direct access storage devices, and maintaining logical connections between client data processors 1-n and file-systems resident on direct access storage devices.

A network mount request/relay path 50 connects operating systems resident on client data processors 1-n to the bitfile server 15, and is the sole path between mass storage system 10 and the client data processors 1-n for passing information related to the staging, that is copying, of file-systems between archival storage devices and direct access storage devices, and for passing information related to the management of logical connections between the client data processors 1-n and file-systems resident on mass storage system 10 direct access storage devices. The network mount request/reply path 50 is implemented as a FDDI ring on mass storage system 10, though other network technologies could be used as well.

Under the command of the bitfile server 15, the storage servers 60-1 to 60-m manage individual archival and direct access storage devices. Each storage server is responsible for maintaining mapping information regarding the collection of file-systems on its associated storage device. In the case of a direct access storage device, the associated storage server must maintain a map of which disk blocks are currently allocated to which file-systems, and which blocks are available for new use. In the case of an archival device, the associated storage server must maintain a map of which media portions contain which file-systems, and which media portions are available for new use. Under command of the bitfile server 15, storage servers also direct the actions of their associated storage devices regarding file-system staging (copying). This direction occurs through special paths 18-1 and 18-m that exist between each storage server and its associated storage device. Depending upon the intelligence of the storage device's controller, direction by a storage server of a copy operation may be very minimal or it may be quite extensive. In some cases, a single command to the storage device from its storage server may be sufficient, while in other cases, the storage server must issue a command for each data block to be transferred. Additionally in some cases a pair of storage servers may need to communicate extensively with each other as well as their own associated devices.

A control path 13 is provided to connect the bitfile server 15 and the data storage servers 60-1 to 60-m to one another. This control path 13 is not physically or logically accessible by the client operating systems 1A resident on client data processors 1-n. Because a high communications bandwidth is not needed for control path activity, the control path 13 can be implemented by means of an Ethernet network which is compatible with many commercially available data storage subsystems, although other network technologies could be used as well.

A third communication path is a high speed channel switching fabric 11 that provides switched-channel connections among data storage devices 40-1 to 40-m and the client data processors 1-n. The channel switching-fabric 11 is implemented using a high speed switch featuring HIPPI-compatible channels, though other network technologies could be used as well.

The mass storage system 10 name server 14 converts each pathname received from client data processors 1 during mount/dismount requests into the name of the physical archive media volume(s) that contains the referenced file-system.

The mass storage system 10 file manager 16 performs a wide variety of global maintenance operations. Among such operations is physical archive media compression. As staging of file-systems occurs to and from archival media, portions of the media are marked unused as older copies of file-systems are replaced by newer copies of the file-systems being staged from direct access storage devices back to the archival storage devices. For a variety of reasons, newer copies of file-systems may need to be placed on different portions of archival media than the pieces from which the file-systems originated. For instance, perhaps the newly staged file system is larger than the original, and won't fit in the original space, or perhaps the archival media can only be written on starting at the end of the last data written.

Eventually, physical media volumes have a large majority of their space marked as unused and the unused spaces are too small to be useful or cannot be used for receiving newly staged file-systems. To recover this unused space, a process called compression is undertaken in which all parts of the physical media volume containing file-systems that are not marked as unused are copied to a new physical media volume, but without any of the intervening unused space being copied. Once this copying is complete, the old physical media volume can be marked as unused in its entirety, and can thus be reused as if it were a new physical media volume, while the new physical media volume receiving the copied file-systems has only one large unused area that spans all of the physical media volume remaining after the copied file-systems.

Client Data Processor 1 Interface to Mass Storage System 10

Figure 4:
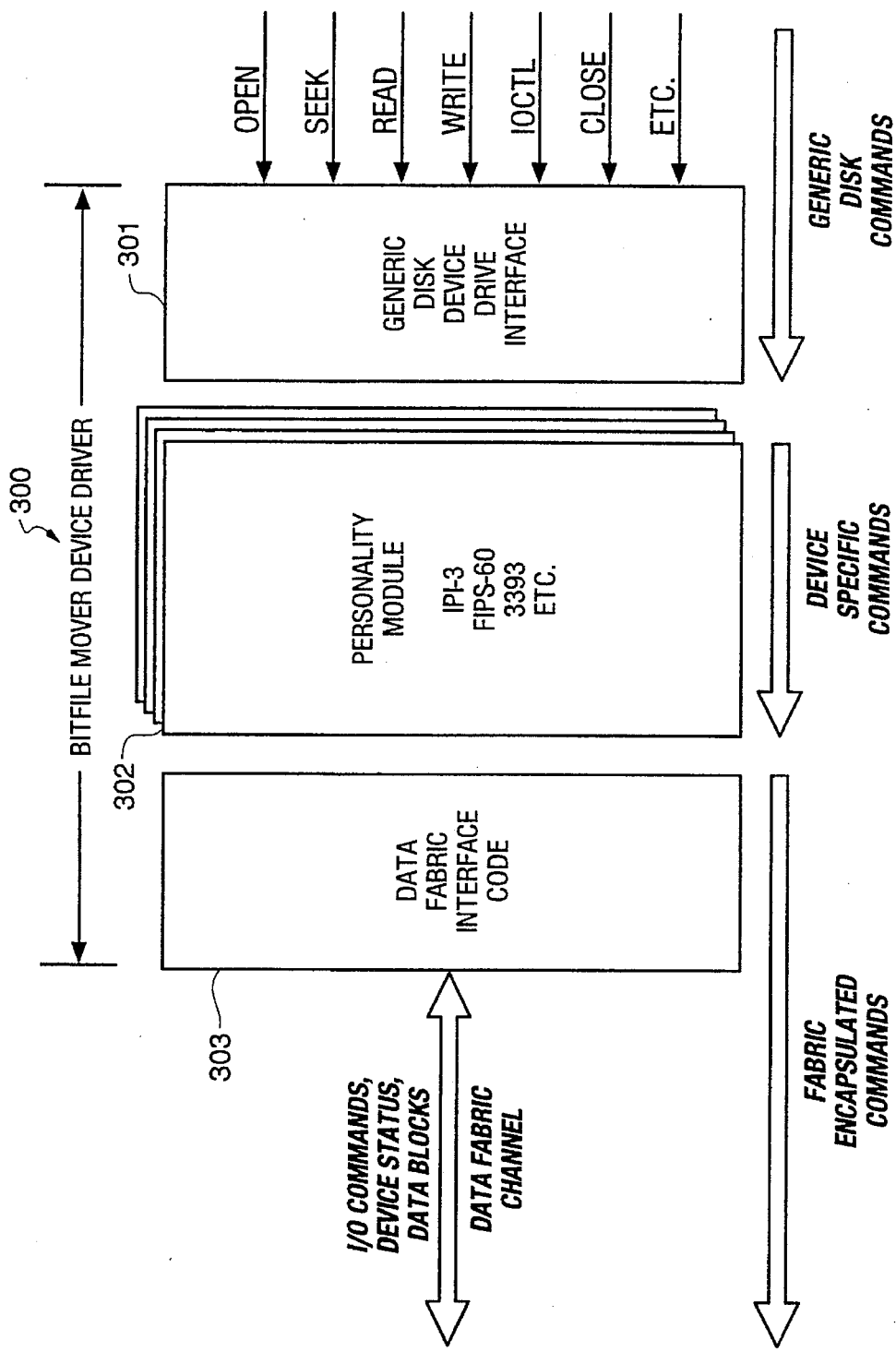
FIG. 4 illustrates in block diagram form the typical mass storage system software interface elements found in a client data processor.

FIG. 4 illustrates in block diagram form the typical interface elements that are found in a client data processor 1 of mass storage system 10. Access to a mass storage system 10 file-system by client data processor 1 occurs as follows:

1. For a user/application 201 on a client data processor 1 to access any byte within any file within any file-system, the file-system code 203 of the operating system 1A on the client data processor 1 must translate the provided path name identifying the file and the ordinal number identifying the byte within the file into the address of a block on a particular direct access data storage device. The file is identified by path name and the byte within the file is identified by ordinal number. The operating system determines in which file-system the file resides. This is done by the following convention: all files and directories in the same file-system share the same beginning portion of a path name. Each file-system is uniquely identified by some path name prefix.

2. The operating system 1A determines on which data storage device the file-system resides. This association of file-system to data storage device is performed when the file-system was mounted. As long as mass storage system 10 and the operating system 1A function, a file-system need only be mounted once; thereafter, the operating system 1A remembers where the file-system is located.

2.1 If the needed file-system must be mounted, the file-system code 203 determines from a table lookup, or assumes by default, that the needed file-system resides on mass storage system 10. If the file-system is a mass storage system 10 file-system, the mounting code 17 is instructed by the file-system code 203 to issue a mount request to mass storage system 10.

2.2 The mounting code 17 utilizes a conventional protocol stack 206 and a conventional network device driver 207 to make its mount request to mass storage system 10 via network mount request/reply path 50. This request includes the path name prefix associated with the file-system.

2.3 The mass storage system 10 executes the mount request, and sends back a mount reply to mounting code 17 via request/reply network mount request/reply path 50, the network device driver 207, and the protocol stack 206. Sufficient information is contained in the mount reply to allow the operating system 1A to determine on which mass storage system 10 direct access storage device the file-system was placed, and where on the direct access storage device the file-system is located. The direct access storage device is identified by a channel-switching fabric device address, while the location on the device is identified by a handle value or an offset value representing the file-system's location relative to the direct access storage device's beginning block.

2.4 Mounting code 17 forwards the identification information in the reply to the file-system code 203 and device driver 300, so that the file-system can be located when its data blocks need to be accessed. In the case of an offset value being returned, device driver 200 adds the offset value to each block address it sends to the direct access storage device 40-2. In the case of a handle value being returned, the device driver 300 sends unaltered block addresses in its I/O requests to the direct access storage device 40-2, but includes elsewhere the handle value, which is used by the direct access storage device 40-2 to decide what offset value it should add to the received block addresses.

2.5 Upon receiving a successful mount reply, the mounting code 17 communicates information received in the reply to the device driver 300 so that the device driver 300 knows which direct access storage device 40-2 contains the file-system F', and where on the direct access storage device 40-2 access can proceed between the direct access storage device 40-2 and device driver 300 across the channel-switching fabric 11 and networked channel paths 20-1 and 30-4 without further intervention by storage server 60-2 or mounting code 17.

3. Because there is no essential difference between a direct I/O channel path and a switched channel path, data block access to the file-system F' can now proceed in a conventional manner by the file-system code 203 and device driver 300 without further intervention by the mounting code 17 or any parts of mass storage system 10 excepting the channel switching-fabric 11 and the data storage device containing the file-system F1. All requests to access the file-system F', whether generated by the operating system 1A itself or by the user, are converted by the file-system code 203 into I/O requests to read or write data blocks on the file-system F'. These block I/O requests are passed to the device driver 300 for execution.

Therefore, access to file-system F' proceeds essentially as described in "Local File Access", and in steps 3.2, 3.3, 3.4, 4, and 5 of "Description of Typical Conventional File-System Access". Similar to what was described in those steps, the device driver 300 produces I/O commands for the direct access storage device 40-2, but additionally encapsulating them in the form required by the channel-switching fabric 11, and writing the encapsulated I/O commands onto I/O channel 20-1. Such encapsulated commands are switched by the channel-switching fabric 11 onto I/O channel 30-4 where they are read by the controller (not shown) of direct access storage device 40-2, decapsulated and executed by the controller for direct access storage device 40-2, resulting in one or more data blocks being transferred to/from device driver 300 via the I/O channel 30-4, channel-switching fabric 11, and I/O channel 20-1 path.

4. When a file-system is no longer needed, it can be dismounted. Either the mass storage system 10, operating system 1A, or the user/application 201 may initiate the dismount request. Dismounting may be initiated for a large number of reasons. Typically, a user/application 201 may initiate a dismount request because the file-system is no longer needed. Typically the operating system 1A may initiate a dismount request as a part of its shut down procedure, or because it detects no use of the file-system by the user/application 201, or because it detects some type of failure while accessing the file-system. Typically mass storage system 10 may initiate a dismount request as part of the shut down procedure of mass storage system 10, because it detects no use of the file-system, or because it detects some type of failure while accessing the file-system. A dismount request initiated by mass storage system 10 is executed starting with step 6. A dismount request initiated from client data processor 1 is executed by the following steps.

5. After waiting for any operations initiated on client data processor 1 on the file-system to complete, mounting code 17 uses protocol stack 206, network device driver 207, and network mount request/reply path 50 to transmit a dismount request to mass storage system 10.

6. After performing the requested dismount, mass storage system 10 returns to mounting code 17 a dismount reply via network mount request/reply path 50, network device driver 207, and protocol stack 206. Mounting code 17 then informs file system code 203 and device driver 300 that the file-system identification and location information can be forgotten. In the case of a dismount reply resulting in a dismount request initiated by mass storage system 10, operating system 1A has more complicated steps to take than if the dismount request initiated on client data server 1 because file-system activity may still be pending on client data server 1 for the file-system. The file-system cannot be accessed again unless it is remounted.

Client Data Processor 1 Device Driver 300

Figure 5:
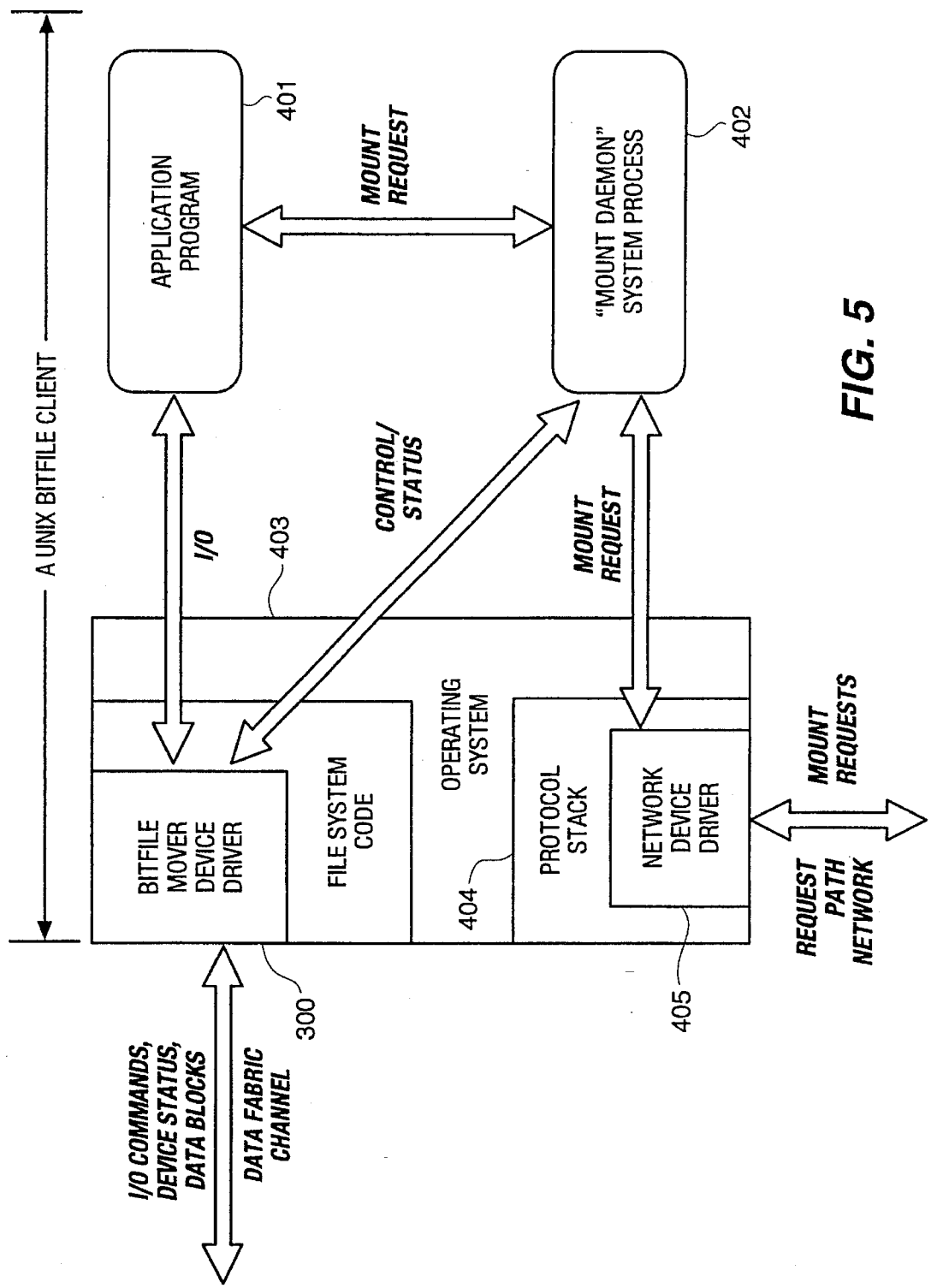
FIG. 5 illustrates in block diagram form the architecture of the client data processor's device driver interface to the mass storage system.

The lowest level interface on the client data processor 1 for data block access to mass storage system 10 file-systems is the device driver 300 for the channel-switching fabric 11. This device driver is illustrated in block diagram form in FIG. 5 and is divided into three separate functional layers.

The outermost layer 301 is an interface to the operating system 1A kernel in the client data processor 1, and which implements a standard block (e.g., disk) driver interface with entry points for the usual block I/O functions such as open, seek, read, write, ioctl, and close. This outermost layer is different for each different type of operating system 1A supported on mass storage system 10. Unlike a standard block device driver which has to deal with the specific characteristics of one, known device type, the mass storage system 10 device driver 300 potentially has to deal with several different types of block storage devices, and further won't know the specific characteristics of the storage devices until the file-system mount is complete. Therefore device driver 300 contains an intermediate layer consisting of a plurality of personality modules 302, one for each different type of storage device that may have a file-system mounted on it for the client data processor 1. Each of these personality modules 302 knows how to deal with the specific characteristics of one of the mass storage system storage devices. That is, each personality module 302 knows how to translate the device driver's entry point block I/O functions into I/O commands that are specific to the architecture of the storage device associated with the personality module 302, and to interpret status information received from the associated storage device.

The innermost layer 303 is the interface to the data channel 20-1 of the high speed channel switching-fabric 11. This innermost layer 303 encapsulates the I/O commands and data blocks in a suitable manner for transmission to the selected data storage device, and decapsulates received status information and data blocks. This innermost layer is different for each different type of channel switching-fabric 11 supported on mass storage system 10. It should be noted that nothing prohibits the innermost device driver layer 303 from being replaced with a conventional protocol stack 206 and a network device driver 207. Thus, given a suitable network connection to a direct access storage device and suitable protocol stack 206 and network device driver 207 software in the direct access storage device controller, the mass storage system 10 client data processor interface is actually extensible to general purpose networks as well as channel-switching fabrics. Further, the direct access storage device controller could actually be any device with a network connection that responds to innermost layer 303 block I/O commands. This device could even be another client data processor. While network data block transfer rates might not be a great as with channel-switching, use of a network to extend the mass storage system 10 concept could be very useful. In particular, the approach is extensible to a much greater number of client data processors and direct access storage devices spanning much greater distances than is possible with a simple channel-switching fabric. In fact, emerging technologies such as ATM will continue to blur the distinction between channel-switches and general purpose networks. However, this blurring is inconsequential to the mass storage system 10 client data processor interface. This interface functions the same way with pure ATM connections as it does with a HIPPI channel-switch. Only the transfer speeds may vary.

Other Functions and Mechanisms to Note

1. Storage devices can hold a plurality of file-systems from a given client data processor, and can hold a plurality of file-systems from a plurality of client data processors.

2. Client data processor operating system code, including but not limited to the device drivers 300 and 207, file-system code 203, mounting code 17 and protocol stack 206, can access a plurality of file-systems located on a single storage device, a plurality of storage devices, and a plurality of file-systems located on a plurality of storage devices.

3. A plurality of user/applications on a plurality of client data processors can access a plurality of file-systems located on a single storage device, a plurality of storage devices, and a plurality of file-systems located on a plurality of storage devices.

4. A plurality of client data processors can access a plurality of file-systems located on a single storage device, a plurality of storage devices, and a plurality of file-systems located on a plurality of storage devices.

5. Access by client data processors to file-systems on mass storage system 10 does not interfere with client data processor access to other file-systems that are not mass storage system 10 file-systems.

6. New mass storage system 10 file-systems may be created by user/applications executing on client data processors, and existing mass storage system file-systems may be deleted by user/applications executing on client data processors. File-systems can also be renamed.

7. The mass storage system 10 allows all of its bitfiles to be treated by user/applications as simple data files for management purposes, even though those bitfiles may at other times be treated by user/applications as file-systems. This means that meta-management of file-systems is possible. Meta-management of file-systems involves associated attribute information being stored by mass storage system outside of the associated file-system data. Such information can involve meta-security information that provides bitfile/file-system security mechanisms beyond any security mechanism built into a particular file-system structure. For instance access passwords and or access control lists could be associated with each bitfile. Meta-management information also allows other meta-management mechanisms to be provided for the bitfiles, such as creation, modification, and retention dates.

8. Mass storage system 10 provides for a global name space for uniquely identifying all of its file-systems across its plurality of client data processors. Mass storage system 10 excepts the file-system path name syntax convention native to each client data processor operating system, and provides a name server to convert these native names into internal physical media volume names.

9. Mass storage system 10 performs all other functions normally necessary for a mass storage system to operate, including but not limited to, archival physical volume media compression, and management and backup of all critical operating tables such as name tables, volume catalogs, etc.

Glossary

Terminology used in computer science to describe the elements of the mass storage system 10 is well-known though some of these terms are defined in this section in order to clarify their particular means as used in this document.

An Application is a program that executes on a data processor.

A bit is a piece of information that may be exactly in one of two states at any given time. A bit is often represented as a 1 or 0.

A bitfile is an arbitrarily long sequential collection of bits, each of which is uniquely identified by an ordinal number, with the first bit being identified by ordinal value zero. The bits in a bitfile may represent a collection of bytes, a file, or a file-system. However, whenever an ordered collection of bits is considered to be a bitfile, no other order or meaning may be given to the collection of bits at the time it is considered to be a bitfile.

A block or data block is a sequential collection of bytes. Each byte in a block may be uniquely identified by an ordinal number. The first byte in a block is byte zero. All blocks are not the same size, but a particular block, once established, never changes in size. Blocks allow collections of bytes to be operated on as a group. Files and file-systems are represented as sets of blocks, and a file-system is represented by a set of sequential blocks each of which is uniquely identified by an ordinal number, with the first block of file system being numbered 0.

A byte is sequential collection of eight bits. Bits in a byte may be uniquely identified by ordinal numbers zero through seven. Bytes allow collections of bits to be operated on as a group.

A channel is typically a specialized, high speed, point-to-point hardware connection between a data processor and a device controller. A channel allows the data processor to send requests represented in a particular controller's command language to that controller and to receive responses from the controller, in order to cause a storage device attached to that controller to access and alter blocks stored on that storage device.

A controller is a hardware device onto which is attached one or more storage devices (either direct or sequential access). The storage devices attached to a particular controller can be uniquely identified by ordinal numbers. The controller maps requests by a data processor for operations on blocks into the hardware operations understood by the storage device. Requests to a controller from a data processor are represented in a command language understood by the controller. Examples of controller commands might be written in English as Read Block 45 of Disk Drive 3, or Rewind Tape Drive 7. The actual command language may differ from controller to controller. The controller may send a response back to a data processor. Examples of controller responses might be written in English as Error 149 While Reading Block 45 on Disk Drive 3 or Tape Rewind Complete on Tape Drive 7.

A data file (or simply "file") is a sequential collection of bytes. Not all files have the same number of bytes. Bytes may be added to or removed from a file, so that a single file may change in size. Each byte in a file may be uniquely identified by an ordinal number. The first byte in a file is byte zero. Files allow a collection of bytes to be operated on as a group.

The term data processor means the same thing as the terms computer, computing system, and computer system, and encompasses all forms of digital, stored program computers including but not limited to supercomputers, workstations, PCs, personal computers, minicomputers, mainframes, microcomputers, and servers.

A device driver is a portion of the operating system which maps the file-system code I/O requests for operations on blocks inside a particular file-system into the appropriate I/O command language for the device controller to which is connected the direct access storage device which contains the particular file-system blocks being accessed. Different device controllers require different I/O command language, and an operating system frequently has several different device drivers, one for each different type of device controller.

Only the device driver for a particular controller needs to understand the I/O command language for that controller. Because a device driver presents a common interface to the file-system code, regardless of the differences of the individual device controllers, the file-system code can issue a set of I/O requests that is common to all device controllers, even though the controllers may be different one from another.

A direct access storage device is a hardware device which stores a collection of blocks, and a mechanism which allows the accessing and/or alternating of any one of the blocks without accessing or altering any of the other blocks on the direct access storage device. Such a method of access means that the time or effort to access any particular block is approximately the same to access any other block on the device. This type of access is often referred to as random access. The number of blocks on a particular direct access storage device is fixed. All blocks on a particular direct access storage devices are the same size. The blocks on a direct access storage device are uniquely identified by an ordinal number, with the first block on the device identified by ordinal value zero. An example of a direct access storage device is a magnetic disk drive.

A directory is a file that defines a set of files. By definition, a directory may also contain other directories, so that a hierarchical organization of files and directories may be defined. Each entry (file or directory) in a particular directory is uniquely identified by a file name. Files and directories may be added to and removed from a directory, or moved out of one directory and into another, so that directories may change in size, and not all directories are the same size. Directories allow a collection of files and directories to be operated on as a group. Since the information about what files or directories are contained in a directory is stored as bits within one or more blocks, just as the information in a file is stored as bits within one or more blocks, a directory can be seen as a special type of file. The difference is in how the bits that are part of the directory are interpreted.

File staging or simply staging is the process by which a data file, bitfile or file-system is copied in its entirety from one storage device to another. Typically, staging occurs between archival storage devices and direct access storage devices. Staging can also occur between storage devices belonging to a client data processor and storage devices belonging to a mass storage system. The process of staging usually occurs at the beginning and ending of a file access operation. Typically, a file is staged from an archival device prior to a direct access storage device prior to data access by the client data processor, while the file is staged from a direct access storage device to an archival storage device after the client data processor is finished accessing the data.

A file-system is a self-contained, self-defining hierarchical collection of data files and directories, and is composed of a sequential collection of blocks which are uniquely identified by a set of ordinal numbers, with the first block identified by ordinal value zero. The structure of a file-system and the organization of the files contained within the file-system is defined solely by information contained in the file-system itself. The file-system contains all of the blocks composing all of the files and directories that are part of it. In addition, the file-system contains information defining which blocks belong to what files and directories, and in what order they occur inside each file and directory. This additional information is stored as bits in blocks on the storage device along with the blocks composing the files and directories inside the file-systems. Files and directories can be added to and removed from a file-system, and they can be moved from one file-system to another. Thus, a file-system can be thought of as nothing more than a collection of blocks on a storage device, or if the contents of the file-system blocks are interpreted, a file-system may be thought of as self-contained, self-defining hierarchical collection of data files and directories. A particular file within the hierarchy of directories and files within the file-system may be identified within the hierarchy by naming the file's path name. A particular byte within any file can be identified by a combination of path name (to identify the specific file) and the ordinal number identifying the byte within the file.

As an example of a file-system, a Unix File-System consists of a tree structure in which a node that may contain branches to other files is called a directory while a node which does not contain branches to other files is a flat file. Each file-system is rooted in a single directory and access to the file-system, no matter how complex its implicit structure of flat files and directories is at the lowest level reduced to reading and writing blocks on a data storage volume. However, note that a set of blocks that to a Unix Client Data Processor may represent a file-system, may only be a bitfile to a mass storage system.

Blocks are a physical organization imposed on collections of bits by hardware storage devices (both direct and sequential access) for reasons of ease of implementation. Bytes, files and directories are a conceptual organization imposed on collections of bits by software for the convenience of users. A file-system defines a mapping of the conceptual organization into the physical organization, by defining a mapping of files and directories onto blocks stored on a direct access storage device. A file-system allows a collection of files and directories to be stored, accessed, and altered, on storage device, and to be operated on as a group.

The file-system code is the portion of an operation system that converts user/application file-system operations on bytes, files and directories into I/O requests to read or write the relevant blocks inside the relevant file-system.

A mass storage system is a collection of hardware and software distinct from the client data processors that permanently/semi-permanently stores, and operates to provide access by the client data processors to, bits, bytes, blocks, bitfiles, files, and/or file-systems that are not permanently/semi-permanently stored in the client data processor memories. Conceptually, a direct access storage device that is channel-connected to a client data processor can be considered to be a mass storage system. However, the term mass storage system usually applies to a larger and more complicated set of storage equipment and software than is encompassed by a single direct access storage device.

Network file service refers to a method of accessing a file-system by a client data processor via a network when the subject file-system is remotely located from the client data processor. The file-system being accessed is located on a different system that is remote from the accessing client data processor, and a network that interconnects the client data processor with the system that has the subject file-system is used to communicate requests and data between the two systems. Typically, software is provided on both systems that makes the remote file-system look to users/applications on the client data processor as if it was resident on a direct access storage device which was directly channel-attached to the client data file processor.

Generally, the term network file service implies that the remote system that has the subject file-system must execute with its own file-system code, file-system commands that are received via the network from the client data processor's file-system code. Network file service is a different type of service than if device driver commands originating from the client data processor were to be executed on the remote system.

An operating system is software that exists between the user/application and the hardware of the data processor. The basic purpose of an operating system is to allow a plurality of users/applications to simultaneously believe that each has exclusive use of the hardware and operating system of a data processor, and at the same time to present to the users/applications a computing/programming model that is much richer and easier to use than the computing model presented by the raw hardware.

The path name for a file is the sequence of the file names of the directories, starting at the top-most directory in the hierarchy (which is referred to as the root directory), which one must pass through to reach the file in question, including the name of the file-system containing the hierarchy that contains the file, and ending with the file name of the file itself. Because there is only one such path to any particular file, this path name is unique within the hierarchy.

A sequential access storage device is a hardware device which stores a collection of blocks sequentially, and a mechanism which allows the accessing and/or altering of any one of the blocks by first accessing all blocks preceding the subject block. The time and effort to access the nth block on such a device is approximately n times the time and effort to access the first block, once the first block is accessed. Blocks may be added past the last sequential block, or blocks at the end of the sequence may be removed. Blocks on a particular sequential access storage device may vary in size. Blocks on a sequential access storage device are frequently used to archive data because the storage media is relatively inexpensive. However, sequential devices are poorly suited for the random access needed to access most file-systems. Therefore, the information on sequential devices is usually copied onto a direct access storage device prior to access. Because sequential storage devices are so frequently used as archival devices, the term archival device is used herein to mean a sequential access storage device.

A switching-channel fabric, or more simply a switching-channel or even channel switch, interconnects multiple data processors and device controllers, each of which has a fixed hardware path to the switch. At any given time the switch establishes temporary connections between pairs of connected devices. Multiple pairs may be temporarily connected, but at any given time a given pair is connected, no other device on the switch may connect to that pair.

A user is a human being who interacts with a client data processor and its operating system to perform some desired computing activity using zero or more applications.

We claim:

1. A mass storage system for storing file systems, each containing at least two data files, for access by at least one processor, comprising:

a plurality of means for storing file systems to provide said at least one processor with access to said file systems;

means interconnecting said at least one processor and said plurality of storing means for exchanging data therebetween;

means connected to said plurality of storing means for regulating flow of data between said plurality of storing means and said at least one processor via said exchanging means;

means connected to said at least one processor and said regulating means for transporting control signals therebetween;

means for storing mapping data indicative of a correspondence between processor file system images that contain at least two data files therein and physical data storage locations in said plurality of storing means used to store said at least two data files in said file system image;

wherein said regulating means are responsive to a one of said processors requesting access to an identified data file for retrieving mapping information from said mapping data storing means indicative of said requested data file and all other said at least two data files in said one file system associated with said requested data file; and means responsive to said at least two data files in said one file system image being stored in one of said plurality of storage means for transmitting via said exchanging means the entirety of said at least two data files in said one file system from said one of said plurality of storage means to a direct access memory for use by said requesting processor.

2. The mass storage system of claim 1 further comprising:

means responsive to said requesting processor terminating its data processing operation on said requested data file for selecting a one of said plurality of storage means to store said file system containing said requested data file therein; and means for transmitting said file system via said exchanging means to said one selected storage means.

3. The mass storage system of claim 1 wherein said at least two data files in said one file system are stored in an archive one of said plurality of storage means, said transmitting means transfers the entirety of said at least two data files in said one file system from said archive one of said plurality of storage means to a direct access one of said plurality of storage means.

4. The mass storage system of claim 3 wherein said direct access memory comprises said direct access one of said plurality of storage means and said at least two data files in said one file system are transferred via said exchanging means from said archive one of said plurality of storage means to said direct access one of said plurality of storage means.

5. The mass storage system of claim 4 wherein said transmitting means transfers the entirety of said at least two data files in said one file system from said direct access one of said plurality of storage means to said requesting processor.

6. The mass storage system of claim 3 wherein said archive storing means comprises:

tape media data storage subsystem.

7. The mass storage system of claim 1 further comprising:

means in said exchanging means for concurrently transferring data comprising said one file system between said storage means and said requesting processor with other data being transferred from other said storing means to other said processors.

8. The mass storage system of claim 1 further comprising:

device driver means, located in said at least one processor, for interfacing said at least one processor with said exchanging means.

9. The mass storage system of claim 1 wherein at least one of said plurality of storing means comprises:

rotating media data storage subsystem.

10. The mass storage system of claim 1 wherein said regulating means maintains mapping data independent of said at least one data processor.

11. The mass storage system of claim 1 wherein said exchanging means comprises a nonblocking network.

12. A mass storage system for storing file systems, each containing at least two data files, for access by a plurality of processors, comprising:

first means for storing a first plurality of file systems in bitfile format to provide high speed access to said first plurality of file systems;

second means for storing a second plurality of file systems in bitfile format on media to archive said second plurality of file systems;

means interconnecting said plurality of processors and said first and second storing means for exchanging data therebetween;

means connected to said first and second data storing means for regulating the flow of data between said first and second data storing means via said exchanging means;

means connected to said processors and said regulating means for transporting control signals therebetween;

means for storing mapping data indicative of a correspondence between processor file system images and physical data storage locations in said first and second data storing means used to store said file systems;

wherein said regulating means are responsive to a one of said processors requesting access to an identified data file in a one of said file system images for retrieving mapping information from said mapping data storing means indicative of an identified file system associated with said requested data file; and means responsive to said identified file system being stored in said second data storage means in bitfile format for transmitting data comprising the entirety of said one file system from said second data storage means to said first data storage means for access by said requesting processor.

13. The mass storage system of claim 12 further comprising:

means responsive to said requesting processor terminating its data processing operation on said requested data file for selecting a one of said second plurality of data storage means to store said file system containing said requested data file therein; and means for transmitting said file system from said first data storage means to said second data storage means.

14. The mass storage system of claim 12 further comprising:

means in said exchanging means for concurrently transferring data comprising said one file system between said first data storage means and said requesting processor with other data being transferred from said first and second data storage means to other said processors.

15. The mass storage system of claim 12 further comprising:

device driver means, located in each said plurality of data processors, for interfacing said plurality of processors with said exchanging means.

16. The mass storage system of claim 12 wherein said first storage means comprises:

rotating media data storage subsystem.

17. The mass storage system of claim 12 wherein said second data storage means comprises:

tape media data storage subsystem.

18. The mass storage system of claim 12 wherein said regulating means maintains mapping data independent of said plurality of processors.

19. The mass storage system of claim 12 wherein said exchanging means comprises a nonblocking network.

20. In a mass storage system for storing file systems, each containing at least two data files, for access by at least one processor, comprising a plurality of data file storage systems to provide access to said file systems for said at least one processor and a network interconnecting said at least one processor and said plurality of data file storage systems for exchanging data therebetween, a method of providing said processors with access to said file systems, comprising the steps of:

regulating flow of data between said plurality of data file storage systems and said at least one processor via said network;

storing in a mapping memory mapping data indicative of a correspondence between processor file system images that contain at least two data files therein and physical data storage locations in said plurality of data file storage systems used to store said at least two data files in said file system;

retrieving, in response to a one of said processors requesting access to an identified data file, mapping information from said mapping memory indicative of said requested data file and all other said at least two data files in a one file system associated with said requested data file; and transmitting via said network the entirety of said at least two data files in said one file system from said one of said plurality of data file storage systems to a direct access memory for use by said requesting processor.

21. The method of claim 20 further comprising the steps of:

selecting, in response to said requesting processor terminating its data processing operation on said requested data file, a one of said plurality of data file storage systems to store said file system containing said requested data file therein; and transmitting said file system via said network to said one selected data file storage system.

22. The method of claim 20 wherein said at least two data files in said one file system are stored in an archive one of said plurality of data file storage systems, said step of transmitting transfers the entirety of said at least two data files in said one file system from said archive one of said plurality of data file storage systems to a direct access one of said plurality of data file storage systems.

23. The method of claim 22 wherein said direct access memory comprises said direct access one of said plurality of data file storage systems and said at least two data files in said one file system are transferred via said network from said archive one of said plurality of data file storage systems to said direct access one of said plurality of data file storage systems.

24. The method claim 23 wherein said step of transmitting transfers the entirety of said at least two data files in said one file system from said direct access one of said plurality of data file storage systems to said requesting processor.

25. The method of claim 20 further comprising the step of:

concurrently transferring data comprising said one file system between said one data file storage systems and said requesting processor with other data being transferred from other said data file storage systems to other said processors.

26. In a mass storage system for storing data files for access by a plurality of processors, comprising a first data file storage system for storing a first plurality of file systems, each containing at least two data files, in bitfile format to provide said plurality of processors with high speed access to said first plurality of file systems, second data file storage system for storing data in bitfile format on media to archive a second plurality of file systems, a network interconnecting said plurality of processors and said first and second data file storage systems for exchanging data therebetween, a method of providing said processors with access to said first and second plurality of file systems, comprising the steps of:

regulating the flow of data between said first and second data file storage systems via said network;

storing mapping data in a mapping memory indicative of a correspondence between host processor file system images and physical data storage locations in said first and second data file storage systems used to store said first and second plurality of file systems;

retrieving, in response to a one of said processors requesting access to an identified data file, mapping information from said mapping memory indicative of said requested data file and a one file system associated with said requested data file; and transmitting, in response to said one file system being stored in said second data storage means in bitfile format, data comprising the entirety of said one file system from said second data file storage system to said first data file storage system for access by said requesting processor.

27. The method of claim 26 further comprising the steps of:

selecting, in response to said requesting processor terminating its data processing operation on said requested data file, said second data file storage system to store said file system containing said requested data file therein; and transmitting said file system from said first data file storage system to said second data file storage system.

28. The method of claim 26 further comprising the step of:

concurrently transferring data comprising said one file system between said first data file storage system and said requesting processor with other data being transferred from said first and second data file storage systems to other said processors.

* * * * *